May 2, 1961 G. E. MAIENKNECHT 2,982,516
MANUAL CONTROL VALVE
Filed April 20, 1959
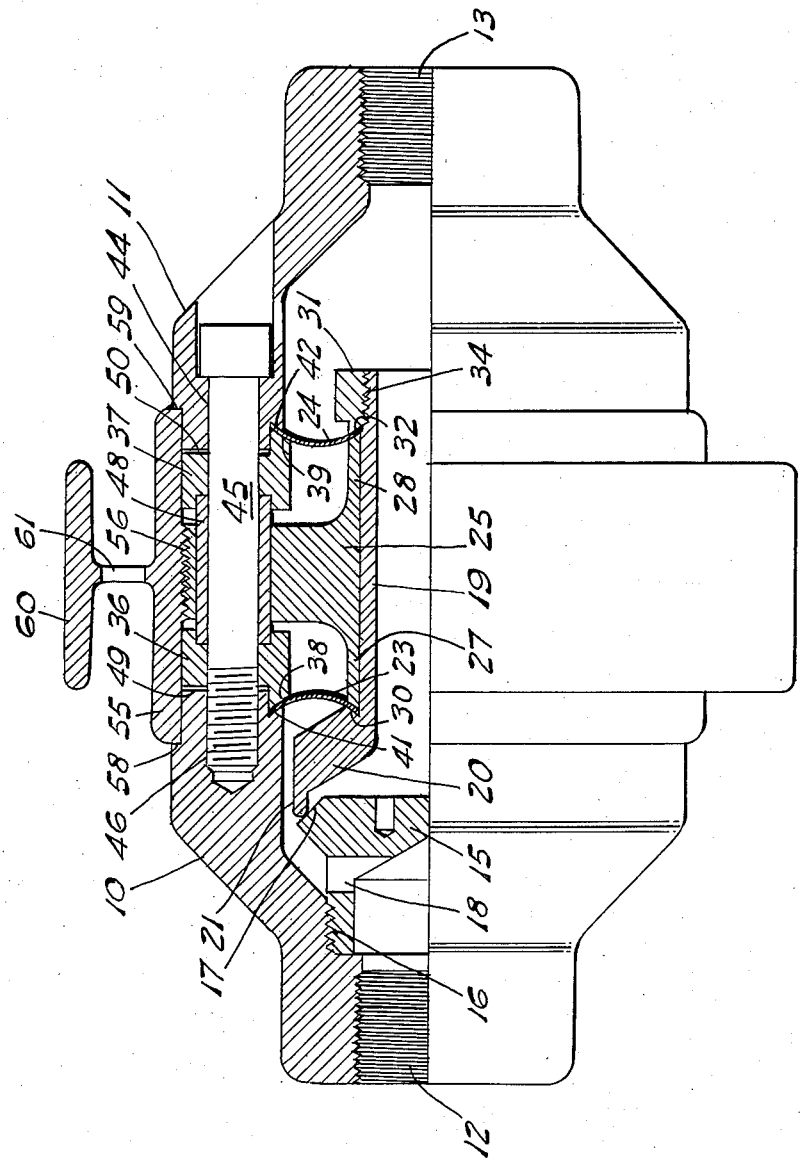
INVENTOR.
GAILE E. MAIENKNECHT
BY
Bean, Brooks, Buckley & Bean
ATTORNEYS United States Patent Office 2,982,516
Patented May 2, 1961

2,982,516

MANUAL CONTROL VALVE

Gaile E. Maienknecht, 364 Rensch Road, Williamsville, N.Y.

Filed Apr. 20, 1959, Ser. No. 807,408

2 Claims. (Cl. 251—340)

This invention relates to valves for controlling the flow of fluid pressure in a conduit or the like and more particularly to a valve which is adapted to be manually adjusted to vary the flow orifice and which is particularly suited for the transmission and control of fluids at high temperatures and high pressures.

The valve of the present invention entirely dispenses with packed joints which are usually found in valves of this general class and the arrangement is such that the entire adjusting mechanism is isolated from the fluid which the valve controls, thereby protecting the mechanism against any effect which the fluid might have thereon and also disposing such mechanism in a space or zone which is not under pressure.

Further objects and advantages of the present invention reside in the manner in which the housing components, the valving components, and the manual valve-controlling means are physically arranged and related with respect to each other from the standpoint of economical manufacture, convenient assembly and disassembly, and foolproof and failproof operation in service.

In the valve of the present invention a generally tubular valve member is shiftable in an axial direction and is so proportioned that a relatively short axial movement from a valve-closed to a valve-open position is required. Further, the manual control member is of relatively large diameter, being the largest diameter part of the valve, and the high mechanical advantage as between the manual control member and the valve proper makes for easy operation and renders the valve self-locking against inadvertent shifting by reason of pressure thereagainst or for any other reason. Furthermore, the relative short axial movement of the valve from closed to fully open position permits quick shifting thereof.

Various other advantages of the valve construction of the present invention will appear to those skilled in the art from a consideration of the embodiment thereof illustrated in the accompanying drawing and described in detail in the following specification. However, it is to be understood that such embodiment is set forth merely by way of example and that various modifications may be made therein without departing from the principles of the present invention as defined in the appended claims.

The single figure of the drawing is a longitudinal cross-sectional view through one form of the manual control valve of the present invention.

In the drawing, the numerals 10 and 11 designate a pair of generally facing cup-shaped coaxial housing members having axial fluid flow openings designated 12 and 13, respectively, the openings 12 and 13 being internally threaded in the present instance to facilitate coupling the same to fluid inlet and outlet conduits. In the present instance the opening 12 comprises an inlet to the valve device and the opening 13 comprises a discharge outlet but the directional flow may be opposite to that indicated, if desired.

A male valve member 15 is threaded into housing member 10 as at 16 and is provided with a bevel or frusto-conical valving surface 17. Radial openings 18 in valve member 15 establish fluid communication between inlet passage 12 and the exterior of valve member 15 including the valving surface 17. A companion female valving member comprises a sleeve 19 having an enlargement 20 at one end thereof which terminates in an axially projecting flange 21 which comprises the female valving element and seats axially over and against the frusto-conical surface 17 when the valve is in closed position.

The fluid containing portion of the interior of the valve of the present invention is isolated from the regulating mechanism by a pair of annular sheet metal diaphragms 23 and 24 which, in the present instance, are concavo-convex in radial cross-section, and the manner in which the diaphragms 23 and 24 are assembled with respect to the sleeve valve 19 and the housing members 10 and 11 will now be described. The numeral 25 designates an annular valve supporting and shifting member which has a central bore portion fitting over sleeve 19 and a pair of axially extending flanges 27 and 28 which project outwardly in opposite directions to form a continuation of the bore of the annular member 25 and terminate in beveled end faces as clearly shown in the drawing.

The enlargement 20 of sleeve valve 19 is provided with an internal bevel 30 complementary to the bevel at the end of flange 27 and a nut 31 at the other end of the sleeve 19 is provided with an internal bevel 32, likewise complementary to the bevel at the end of flange 28. Nut 31 is threaded into the right-hand end of valve sleeve 19 as at 34 and tightening thereof securely clamps the inner peripheries of the diaphragms 23 and 24 between the aforesaid pairs of complementary bevel formations.

A pair of annular clamping rings 36 and 37 are disposed between the facing ends of the housing members 10 and 11 and have, adjacent to their inner peripheral portions, bevel formations 38 and 39, respectively. The end faces of the housing members 10 and 11 are provided with bevel formations 41 and 42, respectively, which oppose the bevel formations 38 and 39, the outer peripheral portions of the diaphragms 23 and 24 being disposed between such bevel formations.

Housing member 11 is drilled and countersunk as at 44 to receive a circumferential series of screws 45 and housing member 10 is tapped as at 46 to receive the threaded ends of such screws. Screws 45 pass through the clamping rings 36 and 37 and through spacer sleeves 48 which abut the facing surfaces of the clamping rings 36 and 37 and, in the present instance, are set into locating counterbores in such faces.

Tightening of the screws 45 clamps the valve assembly, comprising the housing members 10 and 11, the clamping rings 36 and 37, and the spacer sleeves 48, into rigid unitary relationship. The facing surfaces of the housing members 10 and 11 and the clamping rings 36 and 37 are slightly spaced as at 49 and 50 so that the clamping force acts directly against the bevel surfaces 38, 39, 41 and 42 to rigidly and securely clamp the outer marginal portions of the diaphragms 23 and 24 in fluid-tight relationship with respect to the interior wall of the housing assembly.

Thus the space between the diaphragms and the space lying outwardly thereof, which contains the controlling or regulating mechanism, is entirely isolated from the fluid chamber portions of the valve which lie to the left of diaphragm 23 and to the right of diaphragm 24 and the interior of sleeve valve member 19.

The annular valve supporting and shifting member 25 is axially slidable on the several spacer sleeves 48 and is guided accurately thereby, as is the sleeve valve member 19 which is fixed to and carried by the shifting member 25 and accordingly moves axially therewith.

The outer periphery of valve shifting member 25 is threaded to receive internal threads formed on a manually rotatable valve shifting and regulating sleeve 55, the threaded connection between the shifting member 25 and the adjusting or regulating sleeve 55 being designated 56. The facing portions of the outer peripheries of the housing members 10 and 11 are formed with shoulders as at 58 and 59, respectively, to confine the end faces of adjusting sleeve 55 against axial movement of the adjusting sleeve.

Thus the adjusting sleeve 55 is in effect a captive nut and rotation of the same, by reason of the threaded connection 56, moves the valve shifting member 25 and consequently the valve sleeve 19 in an axial direction under precise control and without the application of great force despite the very material fluid pressures which may be present within the valve structure.

Due to the high operating temperatures to which the valve of the present invention may be subjected in certain types of service, the adjusting sleeve 55 is provided with an outwardly spaced annular gripping or manipulating flange 60 which is connected to sleeve 55 by a radial web 61 which is perforated and thus impedes heat conductance from sleeve 55 to the manual flange 60 to a substantial extent.

I claim:

1. In a manual valve, a pair of facing housing members defining a generally cylindrical valve chamber, an annular valve member disposed coaxially in one end of said chamber, a valve sleeve in said chamber and movable axially to and from said annular valve member to form a variable valve passage, the interior of said valve sleeve comprising a fluid conduit leading from said valve passage, said valve sleeve having an enlargement at one end thereof, a tubular member surrounding the sleeve and abutting said enlargement, and a nut engaging the opposite end of the sleeve and abutting the opposite end of said tubular member, a pair of annular diaphragms having their inner peripheries clamped between the abutments at opposite ends of said tubular member and extending generally radially outwardly therefrom, a pair of clamp rings between said housing members and screw means adapted to secure the housing members to each other with the clamp rings held therebetween, the outer margins of each of said diaphragms being clamped between a clamp ring and the adjacent housing member, whereby a central space outwardly of the sleeve valve is sealed from the valve passage and said fluid conduit, means in said space supporting said valve sleeve for axial sliding movement, and regulating means in said space and having a portion accessible externally of said valve for adjusting the axial position of said valve sleeve relative to said annular valve member.

2. In a manual valve, a pair of facing housing members defining a generally cylindrical valve chamber, an annular valve member disposed coaxially in one end of said chamber, a valve sleeve in said chamber and movable axially to and from said annular valve member to form a variable valve passage, the interior of said valve sleeve comprising a fluid conduit leading from said valve passage, a pair of axially spaced annular diaphragms and means for securing their inner peripheries to said valve sleeve with said diaphragms extending generally radially outwardly therefrom, a pair of clamp rings between said housing members and screw means adapted to secure the housing members to each other with the clamp rings held therebetween, the outer margins of each of said diaphragms being clamped between a clamp ring and the adjacent housing member, whereby a central space outwardly of the sleeve valve is sealed from the valve passage and said fluid conduit, means in said space supporting said valve sleeve for axial sliding movement, and regulating means in said space and having a portion accessible externally of said valve for adjusting the axial position of said valve sleeve relative to said annular valve member.

References Cited in the file of this patent

UNITED STATES PATENTS

| | | |
|---|---|---|
| 833,307 | Dake | Oct. 16, 1906 |
| 854,641 | Haley | May 21, 1907 |
| 2,016,997 | Hartke | Oct. 8, 1935 |
| 2,333,913 | Beam | Nov. 9, 1943 |
| 2,382,124 | Bahnson | Aug. 14, 1945 |
| 2,711,754 | McKinney | June 28, 1955 |

FOREIGN PATENTS

| | | |
|---|---|---|
| 13,870 | Great Britain | of 1900 |